United States Patent [19]

Calmettes et al.

[11] Patent Number: 5,553,358
[45] Date of Patent: Sep. 10, 1996

[54] BAND CLAMP FITTING

[75] Inventors: Lionel Calmettes, Romorantin Lanthenay; Pascal Detable, Gievres; Michel Andre, Romorantin Lanthenay, all of France

[73] Assignee: Establissements Caillau, Issy Les Moulineaux, France

[21] Appl. No.: 241,611

[22] Filed: May 11, 1994

[30] Foreign Application Priority Data

May 19, 1993 [FR] France ................................. 93 06045

[51] Int. Cl.$^6$ ..................................................... F16L 33/02
[52] U.S. Cl. ............................................................ 24/20 TT
[58] Field of Search .............................. 24/20 R, 20 LW, 24/20 EE, 20 S, 20 TT

[56] References Cited

U.S. PATENT DOCUMENTS 4,987,652  1/1991  Spaulding ............................... 24/20 R

FOREIGN PATENT DOCUMENTS 003192  7/1979  European Pat. Off. .
243224  10/1987  European Pat. Off. .
344050  11/1989  European Pat. Off. .
460989  12/1991  European Pat. Off. .
491609  6/1992  European Pat. Off. .
491610  6/1992  European Pat. Off. .

*Primary Examiner*—James R. Brittain
*Attorney, Agent, or Firm*—Marshall & Melhorn

[57] ABSTRACT

A clamp fitting is formed by a metal band wound on itself. One end of the band presents an ear radially projecting on the outer periphery of the clamp. The other end of the band is shaped as a hook capable of hooking behind the ear to maintain the clamp in a tightened position. After hooking, on the face of the metal band located opposite the hook bearing zone, the ear is provided with a member integral therewith and of which a zone is capable of coming into stop contact with the inner face of the hook when the latter is being hooked on the ear. This additional contact with the inner face of the hook prevents any relative displacement of the hook with respect to the ear and consequently any increase in the tightening of the clamp.

4 Claims, 2 Drawing Sheets

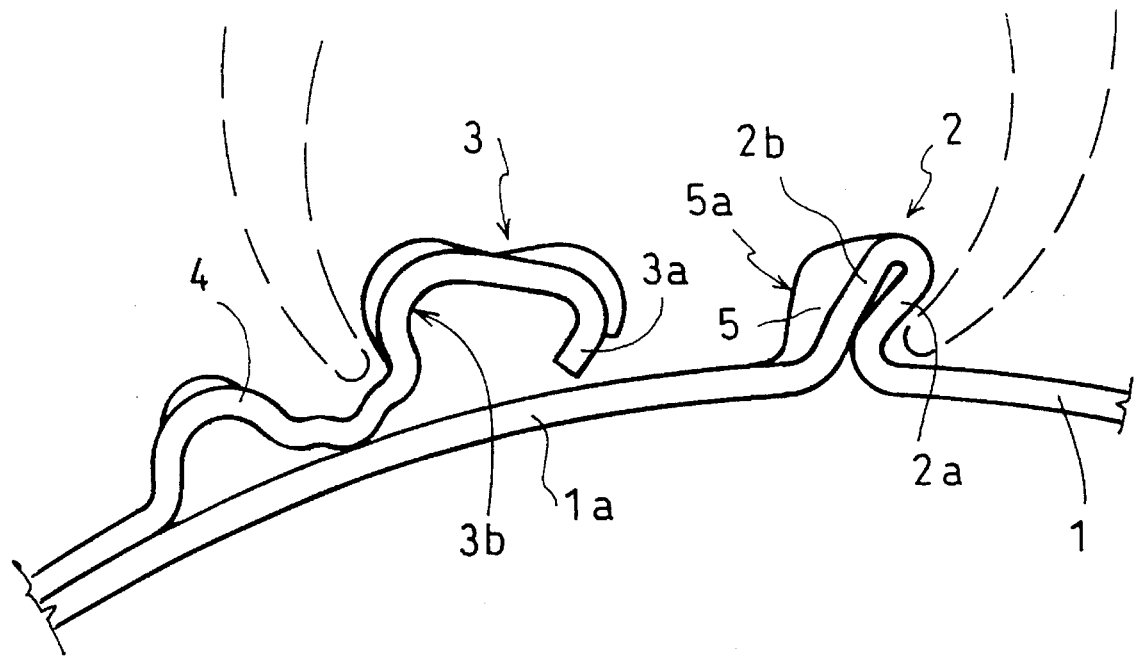
FIG_1
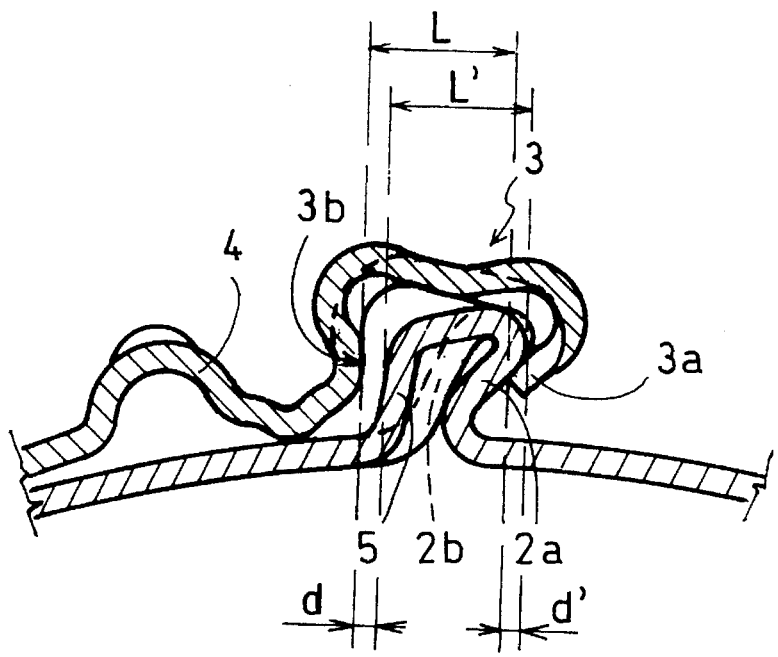
FIG_2

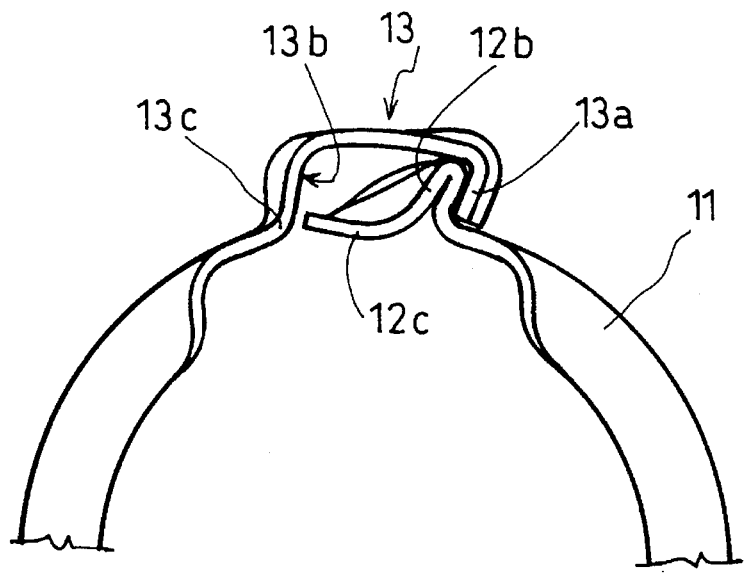
FIG_3
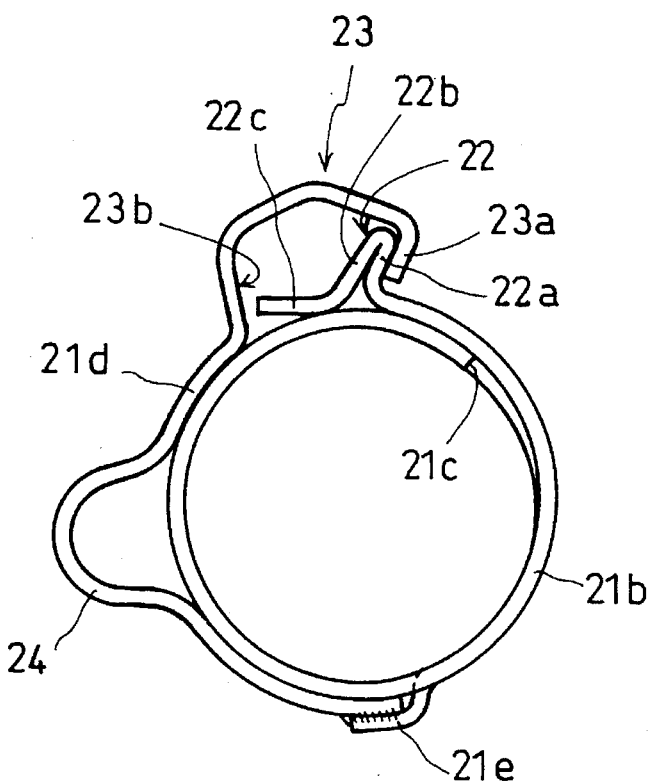
FIG_4

BAND CLAMP FITTING

FIELD OF THE INVENTION

The present invention relates to a band clamp fitting.

BACKGROUND OF THE INVENTION

Patent EP-A-3192 describes a clamp fitting constituted by a metal band, wound on itself, of which one of the ends presents an ear projecting radially on the outer periphery of the clamp and of which the other end is shaped as a hook capable of hooking behind the ear to maintain the clamp tightened.

It is known that one of the principal advantages of this prior-art clamp is that of avoiding, in principle, any permanent deformation of the various zones of the band which constitutes it, when it is positioned and tightened.

This type of clamp has already been improved in various ways. On the one hand, Patent EP-A-344 050 proposes to facilitate tightening of the clamp thanks to a boss disposed on the face of the ear serving as bearing for the free edge of the hook when the clamp is in tightened position. On the other hand, certain improvements aim at giving the clamp a reserve of elasticity enabling a sufficient tightening to be maintained in the event of modification of the dimensions of the object to be clamped, in particular under the effect of the variations in temperature. In this respect, reference may be made to Patents EP-A-469 989, 491 609 or 491 610.

However, it has been realized that, in certain difficult cases, the quality of the clamps described in the Patents mentioned above risk being lost if precautions are not taken when said clamps are placed in position or tightened.

More precisely, when hooking the hook on the ear, the operator may inadvertently provoke a temporarily too great tightening of the clamp. In particular, such excessive tightening is not prevented by the guiding or reinforcing ribs located on the face of the ear opposite the hook-bearing zone, as described in the Patents mentioned above or visible in the drawings accompanying same. This results in that, in certain zones of the clamp, particularly in the reserves of elasticity or in the regions of considerable curvature of the hook itself, the limit of elasticity of the metal is exceeded. Thus, without the operator being able to avoid it, the pressure of tightening of the clamp after it has been positioned is less than that for which the use of the clamp had been recommended by the installer and its dimensional characteristics had been determined by the manufacturer. Such a situation exists in particular in the automobile industry and may lead to serious incidents, particularly if the clamp is intended to ensure tight connection of a flexible pipe fitted on a rigid tube.

It is therefore an object of the present invention to avoid, on the clamps of the types mentioned above, any exceeding of the limit of elasticity of the metal in any zone of the clamp, during positioning and tightening thereof. However, it goes without saying that this problem is to be solved only in the case of a clamp whose dimensional characteristics and the metal of the band are adapted to a determined use and provided therefor.

SUMMARY OF THE INVENTION

According to the invention, the ear is provided, on its face located opposite the hook-bearing zone after hooking, with a member, generally referred to hereinafter as "stop member", which is integral therewith and which is capable of coming into stop contact with the inner face of the hook when the latter is being hooked over the ear, then preventing any relative displacement of the hook with respect to the ear and consequently any increase in the tightening.

Thanks to this very simple arrangement, tightening of the clamp during hooking of the hook cannot exceed what was provided by the manufacturer and there is therefore no longer any risk of exceeding the limit of elasticity of the metal in certain zones of the clamp.

BRIEF DESCRIPTION OF THE DRAWINGS

The invention will be more readily understood on reading the following description with reference to the accompanying drawings, in which:

FIG. 1 is a partial view in elevation of a clamp fitting according to the invention, before the hook is hooked over the ear.

FIG. 2 is a view in section of the clamp of FIG. 1, after hooking.

FIG. 3 is a partial view in elevation of the clamp, after tightening, in the case of a variant embodiment of the stop.

FIG. 4 is a view in elevation of another clamp according to the invention, in the case of a variant of the embodiment shown in FIG. 3.

DESCRIPTION OF PREFERRED EMBODIMENT

Referring now to the drawings, FIGS. 1 and 2 firstly show a clamp of the type in question in which the band 1 wound on itself comprises an ear 2 constituted by two folds 2a and 2b radially projecting on the outer periphery of the clamp. Preferably and as shown, the ear 2 is slightly inclined in the direction opposite the extremity (located to the left in the Figures) of the so-called inner end which bears it. Beyond the ear 2, the band presents an extension 1a, which, as is known in particular by Patent EP-A-3192, advantageously extends at least beyond hook 3, before the clamp is tightened.

The extremity of the other, so-called outer end of the clamp is in fact shaped as a hook 3 intended to be hooked, after the clamp is tightened, behind ear 2. In the example shown, there is also provided, behind hook 3, a reserve constituted by an undulation 4 of the band. Hook 3 and undulation 4 may comprise reinforcing ribs intended to give them the rigidity necessary for a determined application.

As is known, tightening of the clamp and hooking of the hook over the ear are easily effected by means of pincers whose jaws, shown schematically in dashed lines in FIG. 1, abut behind hook 3 and behind ear 2 to bring them closer to each other until the free end 3a of the hook is hooked behind ear 2, abutting on fold 2a thereof.

It has been indicated hereinabove that, during this operation of bringing the hook and the ear closer, the free end 3a of the hook may, in the prior-art clamps, be brought beyond the ear, thus exceeding the limit of elasticity of the metal, for example in the undulation 4 or in certain other zones of the band or of the hook 3 itself.

In order to avoid such a risk, a boss 5 is stamped in fold 2b during manufacture of the clamp, preferably before formation of the ear 2 by the two folds 2a and 2b.

The shape and dimensions of the boss 5 which is integral with the ear 2, are determined so that, after the end 3a of the hook has been hooked behind ear 2, the front face 5a of the boss is located in the immediate vicinity of the inner face 3b of the hook (FIG. 2).

Thus, in the course of tightening and hooking, the displacement of hook 3 in the direction of ear 2 will be limited by the bearing of the stop member constituted by boss 5 on the inner face of the hook, and the operator does not risk tightening the clamp beyond what the manufacturer provided.

It may further be specified, with reference to FIG. 2, that, after hooking, face 5a of the boss, i.e. the stop contact zone of the stop member, is located at a distance d, in the peripheral sense, from the inner face 3b of hook 3.

This distance d is obviously necessary to allow the hook and the ear to be hooked or unhooked, taking into account the geometry of their complementary bearing zones. However, it is essential that this distance d be as small as possible in view of the object of the invention; in fact, it is question of preventing, during tightening, any relative displacement of the hook with respect to the ear, which is not indispensable for hooking (or unhooking) and which would cause a momentary, but unnecessary, increase in the tightening, likely to lead to the drawbacks set forth hereinabove.

It is also interesting to consider, on the outer end of the clamp, the distance L measured in the peripheral sense between the inner face 3b of the hook and the inner edge of its end 3a; there corresponds thereto, on the inner end, the distance L', likewise measured in the peripheral sense, between the rear extreme edge of the fold 2a of the ear and the bearing zone 5a of the stop member 5 on the inner face of the hook. Distance L is substantially equal to distance L', without, however, being less, with the result that the locking necessary for correct hooking of the hook on the ear is effected over a distance d' as close as possible to the distance d defined hereinbefore. This latter distance d is therefore imposed by the distance d' necessary for locking the hooking (or for unlocking during unhooking) and by it alone.

FIG. 3 shows a variant embodiment. The elements already described will be designated by the same references as those used in FIGS. 1 and 2, but increased by 10.

The metal band 11 of the clamp presents in its current part a U-section adapted more particularly to the assembly of two tubes whose ends are widened and may fit between the arms of the U of the section of the clamp. It is also important in this case to avoid exceeding the limit of elasticity of the metal in certain zones of the clamp during tightening.

To that end, fold 12b of ear 12 is provided with an extension 12c which extends substantially along the periphery of the clamp. However, the length of this extension is limited and, especially, its free end forming the stop member is shaped to abut on the inner face 13b of hook 13 during tightening of the clamp. In practice, it will suffice to give the extension 12c a slight curvature towards the outside of the clamp to avoid it sliding beneath the band in the vicinity of the root 13c of the hook. It is obvious for the man skilled in the art that the considerations developed hereinabove, particularly concerning the distances L and L', on the one hand, and d and d' on the other hand, are applicable to this embodiment.

Finally, FIG. 4 shows another variant embodiment in which the references used in FIGS. 1 and 2 are increased by 20 to designate the elements already described.

There again, the stop member integral with ear 22 is constituted by the free end of the extension 22c capable of abutting on the inner face 23b of hook 23.

However, in this variant, it has been sought to re-establish perfect continuity of the inner periphery of the clamp, which was not necessary in the case of the variant of FIG. 3, as is set forth in particular in Applicants' Patent Application filed this day and entitled: "Band clamp fitting structure".

To that end, on a first portion of band 21b are formed extension 22c and ear 22, this portion being totally wound on itself and its inner extremity 21c being provided with means ensuring continuity of the inner surface, such as those described in Patent EP-A-243 224. A second portion of band 21d allows the formation of hook 23 and of reserve 24 and is fixed on portion 21b at 21e, for example by welding.

What is claimed is:

1. A clamp fitting comprising:

a metal band wound on itself defining an inner end and an outer end;

a complementary fastening means on the inner end and the outer end of said metal band, said fastening means including a hook formed at the outer end on said metal band, said hook including a first inner surface at a free end of said hook and a second inner surface opposite the free end of said hook; and an ear integrally formed in said metal band and projecting radially outward therefrom near the inner end, said ear having a hook bearing zone opposite the inner end for engaging the first inner surface of said hook; and a stop member formed in said inner end near the ear of said fastening means, said stop member projecting longitudinally opposite to the hook bearing zone of the ear and radially outward from said metal band, said stop member further forming a stop contact zone toward the inner end of said metal band such that the stop contact zone may engage the second inner surface of said hook to prevent further relative displacement of the hook with respect to the ear as soon as the first inner surface of the hook is conveniently engaging the hook bearing zone of the ear.

2. The clamp of claim 1, wherein said stop member is so shaped that a peripheral distance (L') between the hook bearing zone of the ear and the stop contact zone of said stop member is equal to or slightly smaller than a minimum peripheral distance (L) between the second inner surface and the first inner surface of the hook to allow a locking and an unlocking of said fastening means.

3. The clamp of claim 1, wherein said stop member is constituted by a boss stamped in said metal band in an outer surface of said ear opposite the hook bearing zone.

4. The clamp of claim 1, wherein said stop member is constituted by an inner end segment of said metal band extending from said ear opposite the hook bearing zone, said inner end segment extending substantially along a periphery of the clamp and having a free end shaped to engage the second inner surface of said hook.

* * * * *